United States Patent
Berchowitz et al.

(10) Patent No.: US 7,692,339 B2
(45) Date of Patent: Apr. 6, 2010

(54) STIRLING CYCLE ENGINE

(75) Inventors: David M. Berchowitz, Athens, OH (US); Mamoru Saito, Niigata-ken (JP)

(73) Assignees: Global Cooling BV, Helmond (NL); Twinbird Corporation, Niigata-ken (JP)

( * ) Notice: Subject to any disclaimer, the term of this patent is extended or adjusted under 35 U.S.C. 154(b) by 30 days.

(21) Appl. No.: 12/026,189

(22) Filed: Feb. 5, 2008

(65) Prior Publication Data
US 2009/0193805 A1 Aug. 6, 2009

(30) Foreign Application Priority Data
Aug. 22, 2007 (JP) .............................. 2007-216506

(51) Int. Cl.
*H02K 41/00* (2006.01)
*F04B 17/00* (2006.01)
(52) U.S. Cl. ................... 310/12.01; 310/13; 417/417
(58) Field of Classification Search ............. 310/12–15, 310/156.01–156.84, 261, 216; 417/415–417
See application file for complete search history.

(56) References Cited

U.S. PATENT DOCUMENTS 5,340,288 A * 8/1994 Mikiya et al. ................ 417/417
6,700,088 B1 * 3/2004 Loynes et al. ............ 219/69.15
2005/0214140 A1 * 9/2005 Lee et al. ..................... 417/416
2005/0244290 A1 * 11/2005 Inagaki et al. ................ 417/416
2006/0250032 A1 * 11/2006 Her .............................. 310/13

FOREIGN PATENT DOCUMENTS

JP 2004-180377 A1 6/2004
JP 3769751 B 9/2004

\* cited by examiner

*Primary Examiner*—Quyen Leung
*Assistant Examiner*—Leda Pham
(74) *Attorney, Agent, or Firm*—Frank H. Foster; Kremblas, Foster, Phillips & Pollick

(57) ABSTRACT

To provide a less expensive and high-efficient free-piston Stirling cycle machine with an outer diameter of entire machine being relatively small. In a Stirling cycle cooler as a free-piston Stirling cycle machine including a cylinder 7, a piston 18 which is reciprocable inside said cylinder 7 and an electromagnetic driving mechanism 19 for reciprocating said piston 18, said electromagnetic driving mechanism 19 is comprised of a mover 20 and a stator 35, said piston 18 and said mover 20 formed by disposing a permanent magnets 24 outside an inner yoke 23 made of magnetic flux conducting material are disposed in an axial alignment, and said stator 35 and said cylinder 7 are disposed in an axial alignment. By this disposition, the outer diameter Rm of said mover 20 of said electromagnetic driving mechanism 19 can be reduced, and consequently the inner diameter Rs and the outer diameter of said stator 35 provided outside said mover 20, eventually the outer diameter of entire Stirling cycle cooler can also be reduced.

6 Claims, 13 Drawing Sheets

(a)

(b)

STIRLING CYCLE ENGINE

CROSS-REFERENCES TO RELATED APPLICATIONS

This application claims foreign priority benefits under 35 U.S.C. 119(a)-(d) or (f) of application number JP 2007-216506 filed in Japan on Aug. 22, 2007 which is herein incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present invention relates to Stirling cycle machines such as Stirling cycle cooling or power producing machines.

Conventionally, as in this kind of a Stirling cycle machine, a free-piston Stirling cycle machine is provided with a piston slidably inserted inside a cylinder and a driving device (this corresponds to an electromagnetic mechanism of the present invention) disposed at an outer peripheral side of a proximal end of said cylinder for reciprocally driving said piston is known (for example, in Japanese patent publication No. 3769751. Said driving device is comprising of: a mover connected to a proximal end of said piston, said mover comprising of a short cylindrical shaped supporter coaxially extended on an outer periphery at a proximal end side of said cylinder and a permanent magnet fixed to said supporter; and a stator comprising of an annular electromagnetic coil and an electromagnetic cores which are disposed in proximity to an outer periphery of said permanent magnet and a magnetic conducting portion (this corresponds to the inner yoke in the present invention) disposed in proximity to an inner periphery of said permanent magnet. Normally, as shown in FIG. 13, said magnetic conducting portion is arranged to have cylindrical shape as a whole by disposing sheet steels formed into predetermined shapes in a radial alignment, i.e. in an alignment which lateral direction of each sheet steel radiate from the central axis. Another type of a free-piston Stirling refrigerator is also known, which comprises of a holder provided with a movable yoke (this corresponds to the inner yoke in the present invention), said holder defining an electromagnetic driving mechanism for a free-piston Stirling refrigerator (this corresponds to the electromagnetic mechanism in the present invention), wherein a permanent magnet is attached to said movable yoke (for example, in Japanese un-examined patent publication No. 2004-180377). By attaching said permanent magnet to said movable yoke, there will be no gap between said inner yoke and said permanent magnet, and this results in preventing the magnetic flux density from decreasing and the power density of said electromagnetic driving mechanism can be enhanced.

[Reference 1] Registered Patent Publication No. 3,769,751
[Reference 2] Unexamined Patent Publication No. 2004-180377

DISCLOSURE OF PRESENT INVENTION

Problems to be Solved by Present Invention

Conventional free-piston Stirling cycle machines have had a problem that the outer diameter of entire Stirling cycle machine becomes larger because the mover of said driving device is disposed at an outer peripheral side of said piston and further a stator of said driving device is disposed outside of said mover. Where a Stirling cycle machine has a large outer diameter, accordingly a casing should be thickened in order to endure the inner pressure, then the Stirling cycle machine becomes heavier and the manufacturing cost also increases. It is possible to decrease the copper volume by reducing the number of turns of the electromagnetic coil to decrease the outer diameter of said stator, however, this causes a problem that the performance of the electromagnetic mechanism (output of mechanical power of a driving device or production of electric power of mechanical power of a power generating device) will be deteriorated, because the magnetic field generated by said coil becomes weak. It is also possible to slenderize the wire forming said electromagnetic coil in order to ensure the numbers of turns of electromagnetic coil as well as form the outer diameter of the stator smaller, however, this will also cause a decrease of efficiency because slenderizing the wire causes an increase of copper loss.

It is, therefore, an object of the present invention to solve above-mentioned problems and to provide a less expensive and efficient free-piston Stirling cycle machine with the outer diameter of entire machine being relatively smaller.

Means for Solving the Problems

A free-piston Stirling cycle machine described in claim 1 of present invention comprises: a cylinder, a piston which is reciprocable in said cylinder and an electromagnetic mechanism comprised of a stator and a mover, wherein said mover is comprised of an inner yoke made of magnetic flux conducting material and a permanent magnet provided outside said inner yoke, said mover of said electromagnetic mechanism and said piston being disposed in an axial alignment, and said stator of said electromagnetic mechanism and said cylinder are disposed in an axial alignment.

A free-piston Stirling cycle machine described in claim 2 is a Stirling cycle machine according to claim 1, wherein the permanent magnet of said mover is clamped and held by said piston and a mover base portion defining said mover.

A free-piston Stirling cycle machine described in claim 3 is a Stirling cycle machine according to claim 1 or 2, wherein said mover is formed to have an outer diameter which is equal to or shorter than the outer diameter of said piston.

A free-piston Stirling cycle machine described in claim 4 is a Stirling cycle machine according to claim 1 or 2, wherein said stator is formed to have an inner diameter which is equal to or greater than the inner diameter of said cylinder.

A free-piston Stirling cycle machine described in claim 5 is a Stirling cycle machine according to any one of claims 1 to 4, wherein at least said mover side of said piston is formed of electrically insulating material.

A free-piston Stirling cycle machine described in claim 6 is a Stirling cycle machine according to any one of claims 1 to 5, wherein said inner yoke is formed of wires and said wires are aligned substantially parallel with an axial direction of said mover and piston.

BRIEF SUMMARY OF THE INVENTION

Effect of the Invention

According to the Stirling cycle machine described in claim 1, by constructing a Stirling cycle machine as explained above, the outer diameter of the mover of said electromagnetic mechanism can be reduced in comparison to that of conventional structures to be simply the outer diameter of the piston. By this arrangement, the inner and outer diameters of said stator of said electromagnetic mechanism disposed outside said mover are reduced for the entire Stirling cycle machine. Moreover, when the inner and outer diameters of the stator of the said electromagnetic mechanism are disposed outside said mover and therefore reduced, the length of the coil wire can also be reduced compared to conventional structures if the thickness and numbers of turns of the wire comprising the coil are same as those of conventional structures. In other words, if the cross-sectional area of the electromagnetic coil is the same as that of the conventional electromagnetic mechanism, then because the average coil diameter is smaller, there is less copper in the proposed invention. Accordingly, not only is the copper quantity reduced, but, copper loss is also reduced and the efficiency of said electromagnetic mechanism can be improved in this respect.

By clamping and holding said permanent magnet of said mover by both said piston and said mover base portion, said piston and mover can be integrated so that said piston and mover can be easily assembled, and the extension of the dimensions of said Stirling cycle machine in an axial direction can be minimized.

Moreover, by forming the outer diameter of said mover equal to or less than the outer diameter of said piston, said mover is prevented from abutting said cylinder even if said mover together with said piston moves toward said cylinder.

Furthermore, by forming the inner diameter of said stator equal to or greater than the inner diameter of said cylinder, said piston is prevented from abutting said stator even if said piston together with said mover moves toward said stator.

Additionally, by forming at least said mover side of said piston with electrically insulating material, no eddy current will be generated to said piston, therefore eddy current loss can be kept to a lower level. This realizes the prevention of efficiency deterioration of said electromagnetic mechanism.

Since said inner yoke is comprised of wires and said wires are disposed in substantial parallel alignment in an axial direction of said mover and piston, the packing density of said inner yoke can be increased and the magnetic flux carrying capability of said electromagnetic mechanism can also be improved compared to conventional inner yokes which have steel sheets disposed in cylindrical and radial alignment. In other words, if the cross-section area of said inner yoke is same as the cross-section area of a conventional inner yoke, the outer or inner diameter of said inner yoke can be reduced compared to that of conventional structure using sheet steels. Consequently, the outer diameter of said mover, the inner and outer diameters of said stator positioned outside said mover and eventually the outer diameter of entire Stirling cycle machine can be reduced.

DETAILED DESCRIPTION OF THE INVENTION

Preferred Embodiment of Present Invention

Next is an explanation of a first embodiment of present invention with reference to FIGS. 1 to 5. In this embodiment, explanation is made using a free-piston type Stirling cycle cooler as an example of free-piston Stirling cycle machines. Directions in following explanation are with reference to FIG. 1, which is taken as a standard posture. In FIG. 1, numeral 1 shows a casing. This casing 1 is comprised of: an upper casing 2 having a cylindrical portion 2A formed substantially cylindrical with respect to the central axis Z and a disk-shaped portion 2B formed at a lower end of said cylindrical portion 2A; and a lower casing 3 forming a body section of a Stirling cycle cooler. Said upper casing 2 is made of, for example, stainless steel. A proximal portion 4, an intermediate portion 5 and a distal portion 6 of said cylindrical portion 2A and the disk-shaped portion 2B are formed integrally to each other.

Inside said casing 1, a cylinder 7 is disposed coaxially with the central axis Z. Said cylinder 7 is formed integrally with flange-shaped mount 8 and connecting arm 9 using aluminum or the like. Said mount 8 is formed integrally with said cylinder 7 in a proximity to a lower end of said cylinder 7. The mount 8 employs a structure such that one side surface 8A thereof contacts a mount portion 2C formed on a lower surface of a disk-shaped portion 2B of said upper casing 2. Said mount 8 is fixed to said mount portion 2C by screws, while the other side surface 8B thereof contacts an upper end of an outer yoke 38 comprising a stator 35 of an electromagnetic driving mechanism 19 sometimes referred to as a 'linear motor' (to be explained later). Moreover, at said mount 8, a plurality of connecting arms 9 extends downwardly and substantially parallel with an axial direction of said cylinder 7 from said mount 8 to said cylinder 7, and female screws 9A are formed at their distal ends (lower ends). At a distal end portion 6 side of said cylinder 7, an extended cylinder 10 which is separate from said cylinder 7 is connected coaxially with the central axis Z to the distal end of the cylinder 7 adjacent to the distal portion 6. At a distal end side of said cylinder 7 and inside said extended cylinder 10, a displacer 11 is slidably accommodated along the central axis Z. Furthermore, an expansion chamber E is provided between a distal end of said displacer 11 and the distal portion 6 of said cylindrical portion 2, while the inside and outside of said extended cylinder 10 are communicated to each other via an aperture 12. In said intermediate portion 5, a regenerator 13 is provided between an inner periphery of said cylindrical portion 2 and an outer periphery of said extended cylinder 10. In the proximal portion 4, a communication hole 14 for allowing the inside of the cylinder 7 to communicate with the outside thereof is formed on said cylinder 7 itself. Heat-transferring fins 15 are provided as the heat acceptor between the inner periphery of the distal portion 6 of said cylindrical portion 2 and the outer periphery of the distal end of said extended cylinder 10, while heat-transferring fins 16 are provided as the heat rejector between the inner periphery of said cylindrical portion 2 and the outer periphery of said cylinder 7 in between said regenerator 13 and said communication hole 14. Furthermore, a path is formed which extends from the inner distal end of said extended cylinder 10 through said aperture 12, heat-transferring fins 15, regenerator 13, heat-transferring fins 16 and communication hole 14 to reach to a compression chamber C provided inside said cylinder 7.

Inside proximal portion 4 of said upper casing 2 and said lower casing 3, a mover assembly 17 is included. Said mover assembly 17 is comprised of: a substantially cylindrical piston 18 provided at an upper side; and a mover 20 of the electromagnetic driving mechanism 19 provided at a lower side of said piston 18. Said piston 18 is connected coaxially with and above said mover 20 with respect to the central axis Z. Further, a rod through-hole 21 is coaxially formed in the piston 18, while a displacer rod 31 (to be described later) is inserted into the rod through-hole 21. On the other hand, said mover 20 is comprised of: a base main body 22 defining a mover base portion; an inner yoke 23 mounted on an outer periphery of said base main body 22; permanent magnets 24 mounted on an outer periphery of said inner yoke 23; spacer 25 for positioning said permanent magnets 24 in an axial direction; and a fixing member 26 defining said mover base portion and provided for the purpose of fixing said inner yoke 23 to said base main body 22. At the center of said base main body 22, a rod through-hole 27 is formed corresponding to said rod through-hole 21. As shown in FIG. 4, said piston 18 and said mover 20 are connected coaxially with respect to the central axis Z and adjacently in an axial direction to each other, by inserting a male screw 28 formed on said fixing member 26 and positioned at an upper end side of said mover 20 into said piston 18 from the lower end of said piston 18 and then threading said male screw 28 into a female screw 29 formed on an inner side of said piston 18. Said permanent magnets 24 are clamped and held by said piston 18 and the base main body 22 (the mover base portion) indirectly through said inner yoke 23 and the spacer 25, by threading the male screw 28 of said fixing member 26 into said female screw 29 of said piston 18. As described above, said permanent magnets 24 can be held easily by said mover 20 by clamping and holding said permanent magnets 24 between said piston 18 and the base main body 22, thereby not only can said mover assembly 17 be easily assembled, but an extension of dimensions in axial direction of said mover assembly 17 can be minimized because said piston 18 and said mover 20 are positioned adjacently to each other in an axial direction. Outer diameter Rp of said piston 18 is formed slightly greater than the outer diameter Rm of said mover 20.

Moreover, said spacer 25 is made from electrically insulating material Said spacer 25 is also made from electrically insulating material. Said spacer 25 may be made from the same material as said piston 18.

To said base main body 22, a center part of a first flat spring 30 for controlling the operation of both said piston 18 and said mover 20 is attached. Moreover, to the proximal side of said displacer 11, one end of the displacer rod 31 is connected for controlling the operation of said displacer 11, while the other end of said displacer rod 31 is connected to a center part of second flat springs 32. Said displacer rod 31 extends in a manner that it penetrates the mover assembly 17 throughout the rod through-hole 21 of said piston 18 and said rod through-hole 27 of said base main body 22. Outer peripheral portion of said first flat spring 30 is abutted to the distal ends of said connecting arms 9. Cylindrical spacer 33 is provided between an outer peripheral portion of said first flat spring 30 and an outer peripheral portion of said second flat springs 32. By threadingly engaging bolts 34 which thread through said second flat springs 32, spacer 33 and first flat spring 30 with female screws 9A of said connecting arms 9, these first flat spring 30 and second flat spring 32 are fixed to said connecting arms 9 under a condition where said first flat spring 30 and second flat springs 32 are spaced to each other. Therefore, in said lower casing 3, said first flat spring 30 is positioned nearer to the proximal end side of said cylinder 7 by the length of said spacer 33 than said second flat spring 32.

Numeral 35 shows a stator of said electromagnetic driving mechanism 19. Said stator 35 is comprised of: an electromagnetic coil 37 wound on a bobbin 36; and an outer yokes 38 and 39 mounted in a manner that said outer yokes 38 and 39 clamp said electromagnetic coil 37 from upper and lower sides. Said outer yokes 38 and 39 are formed with cutouts 38A and 39A in a manner that said cutouts 38A and 39A do not contact with said connecting arms 9. Said stator 35 is disposed between said mount 8 and fixing ring 40, and bolts 41 which thread through said fixing ring 40 are threadingly fixed to female screws (not shown) formed on said mount 8. By this way, said stator 35 is fixed to said mount 8 and eventually to said cylinder 7 formed integrally with said mount 8. Cutouts (not shown) are formed on the outer yokes 38 and 39 of said stator 35 in a manner that said cutouts do not contact with said bolts 41. Under this condition, as shown in FIG. 3, said cylinder 7 and said stator 35 are coaxially aligned with respect to the central axis Z in an axial direction. Moreover, the inner diameter Rc of said cylinder 7 is formed to be slightly shorter than the inner diameter Rs of said stator 35. Said piston 18 of said mover assembly 17 is slidably inserted into said cylinder 7 and said mover 20 of said mover assembly 17 is positioned inside said stator 35.

Said lower casing 3 is provided with a connecter 42 for supplying power to the electromagnetic coil of said stator 35 of said electromagnetic driving mechanism 19.

Next is an explanation of the effect of present embodiment. First, a power cord (not shown) is connected to said connecter 42. Then alternating current of predetermined frequency is applied to said electromagnetic coil 37 of said stator 35 of said electromagnetic mechanism 19 from a power source (not shown) provided outside said casing 1 through a driving circuit (not shown) and said power cord. As described above, by applying alternating current to said electromagnetic coil 37, an alternating magnetic field is generated from the electromagnetic coil 37 and concentrated around said outer yokes 38 and 39. A force for allowing the permanent magnets 24 to reciprocate along the axial direction of the cylinder 7 is then generated by the generated alternating magnetic field. Due to this force, the piston 18 connected to said mover 20 including said permanent magnets 24 and inner yoke 23 starts reciprocating in the cylinder 7 along the axial direction of the cylinder 7. When the piston 18 travels toward the displacer 11, all the gas above the piston 18 is compressed. The compressed gas has a higher pressure than the pressure on the other side of the piston 18 thus creating a force on the displacer rod 31 and thereby forcing the displacer 11 to move in order to move the gas. The warmer gas in compression chamber C then flows towards the expansion chamber E located in between the distal end of the displacer 11 and the distal portion 6 of the cylindrical portion 2A, through the communication hole 14, heat transferring fins 16, regenerator 13, heat transferring fins 15 and aperture 12. On the other hand, when said piston 18 travels away from said displacer 11, the gas above the piston 18 is subjected to reduced pressure and the displacer 11 moves in the opposite manner and gas in the expansion chamber E flows towards to the compression chamber C through the aperture 12, the heat-transferring fins 15, the regenerator 13, the heat-transferring fins 16 and the communication hole 14. Throughout these processes, a reversible cycle consisting of two approximate isothermal changes and two approximate constant volume changes is carried out, thus the adjacent part of said expansion chamber E is brought into a low temperature state, while the adjacent part of said compression chamber C is brought into a high temperature state.

As described above, in the present invention, an outer diameter Rm of said mover 20 can be reduced compared to conventional structures which is in substantial coaxial alignment of the components from inward to outward, i.e. at the most inward a piston 18' is positioned, then follows a cylinder 7', an inner yoke 23' (this is included in a stator 35' under a conventional structure), a mover 20' and at the most outward a stator 35' is positioned, since said piston 18 and the mover 20 of said electromagnetic driving mechanism 19 are positioned adjacently to each other in an axial direction and said cylinder 7 and the stator 35 of said electromagnetic driving mechanism 19 are positioned coaxially adjacently to each other in an axial direction. According to above described disposition, an inner diameter Rs and an outer diameter of said stator 35 positioned outside said mover 20 can also be reduced, consequently a diameter of cylindrical body section of a Stirling cycle cooler can also be reduced. In other words, as shown in FIG. 5, if the outer diameter Rp of said piston 18 and the inner diameter Rc of said cylinder 7 are respectively equal to the outer diameter Rp' of said piston 18' and the inner diameter Rc' of said cylinder 7' in a conventional structure (Rp=Rp', Rc=Rc'), length of the inner diameter Rs of said stator 35 can be reduced compared to the inner diameter Rs' of said stator 35' in a conventional structure by the total thickness of said cylinder 7', said inner yoke 23' and mover 20' in a conventional structure. (The reduced dimension of the inner diameter Rs of said stator 35 in the present invention, namely the differential between the inner diameter Rs of said stator 35 and the inner diameter Rs' of said stator 35' in a conventional structure varies according to, for example, gaps between components in a conventional structure or differential between the outer diameter Rc of said cylinder 7 and the inner diameter Rs of said stator 35.) Since the length of the inner diameter Rs and outer diameter of said stator 35 can be reduced compared to a conventional structure, the length of the electric wire constructing said electromagnetic coil 37 can also be reduced compared to a conventional structure where the thickness and numbers of turns of the wire constructing said electromagnetic coil 37 to be wound on said stator 35 are the same. By this construction, copper loss can be reduced and eventually the electrical efficiency can also be improved and mass can also be reduced. As described above, there is a possibility that the axial dimension of a Stirling cycle cooler may become larger because of the axial alignment of said piston 18 and the mover 20 of said electromagnetic driving mechanism 19 and the axial alignment of said cylinder 7 and the stator 35 of said electromagnetic driving mechanism 10. Since said piston 18 and said mover 20 are positioned adjacently to each other and said cylinder 7 and the stator 35 are positioned adjacently to each other, an extension of dimensions in the axial direction of said Stirling cycle cooler may be minimized.

As described above, since the inner diameter Rc of said cylinder 7 is formed slightly shorter than the inner diameter Rs of said stator 35 and the outer diameter Rp of said piston 18 is formed slightly greater than the outer diameter Rm of said mover 20, the permanent magnets 24 of said mover 20 is prevented from being contacted with the inner surface of said cylinder 7 and said piston 18 is also prevented from being contacted with the inner surfaces of the outer yokes 38 and 39 of said stator 35. Accordingly, said piston 18 can be prevented from being damaged by contacting with the inner surfaces of said outer yokes 38 and 39 in a case if said piston 18 or mover 20 travels beyond predetermined stroke for some reasons or in course of manufacturing. Moreover, said cylinder 7 or said permanent magnets 24 can be prevented from being damaged because of said permanent magnets 24's contacting with the inner surface of said cylinder 7.

Furthermore, since said piston 18 is formed of an electrically insulating material, no eddy current will be generated in said piston 18 even if said reciprocating piston 18 enters into a magnetic field generated by said stator 35. Therefore, eddy current losses may be kept to a lower level, thereby improving the efficiency of said electromagnetic driving mechanism 19.

As described above, the first embodiment relates to a free-piston Stirling cycle cooler as the Stirling cycle machine comprising of a cylinder 7, a piston 18 which is reciprocable in said cylinder 7 and an electromagnetic driving mechanism 19 to reciprocate said piston 18, wherein said mover 20 is configured such that said permanent magnets 24 are disposed outside said inner yoke 23 made of magnetic conductive material, said mover 20 defining said electromagnetic driving mechanism 19 and said piston 18 are axially aligned to each other with respect to the central axis Z and said stator 35 defining said electromagnetic driving mechanism 19 and said cylinder 7 are axially aligned to each other, thereby the outer diameter Rm of said mover 20 of said electromagnetic driving mechanism 19 can be reduced. Accordingly, the outer diameter of said stator 35 provided outside said mover 20, eventually the outer diameter of entire Stirling cycle cooler can also be reduced. Since the inner diameter Rs and the outer diameter of said stator 35 positioned outside said mover 20 is reduced, length of the coil wire can be shortened without changing thickness and numbers of turns of the wire defining said electromagnetic coil 37, in other words, without changing the cross-section area of said electromagnetic coil 37, compared to a conventional structure, therefore the efficiency of said electromagnetic driving mechanism 19 can be improved by keeping copper loss to a lower level.

Moreover, in the first embodiment, by clamping and holding said permanent magnets 24 defining said mover 20 by both said piston 18 and said base main body 22 defining a mover base portion of said mover 20, said piston 18 and mover 20 can be integrated so that said piston 18 and mover 20 can be easily assembled into said mover assembly 17. Furthermore, said piston 18 and said mover 20 are positioned adjacently to each other since said piston 18 is directly secured to said mover 20. Accordingly, the extension of the dimensions of said Stirling cycle cooler in an axial direction can be minimized.

Furthermore, in the first embodiment, by forming the outer diameter Rm of said mover 20 equal to or shorter than the outer diameter Rp of said piston 18 (Rm=<Rp), more preferably by forming the outer diameter Rm of said mover 20 shorter than the outer diameter Rp of said piston 18 (Rm<Rp), said mover 20 or said cylinder 7 can be prevented form being damaged because of said mover 20's contacting with said cylinder 7 even if said mover 20 together with said piston 18 enters into said cylinder 7.

Moreover, in the first embodiment, by forming the inner diameter Rs of said stator 35 equal to or greater than the inner diameter Rc of said cylinder 7 (Rs>=Rc), more preferably by forming the inner diameter Rs of said stator 35 greater than the inner diameter Rc of said cylinder (Rs>=Rc), said stator 35 or said piston 18 can be prevented form being damaged because of said piston 18's contacting with said stator 35 even if said piston 18 together with said mover 20 enters into said stator 35.

Furthermore, in the first embodiment, since said piston 18 is formed of an electrically insulating material, no eddy current will be generated in said piston 18 even if said reciprocating piston 18 enters into the magnetic field generated by said stator 35. Therefore, eddy current loss can be kept to a lower level, thereby the improving the efficiency of said electromagnetic driving mechanism.

Next is an explanation of a second embodiment of present invention with reference to FIG. 6. It is noted that common compositions and/or effects between first embodiment and second embodiment will be omitted, for example in these two embodiments compositions other than those of the mover assembly 50 and effects are common. Said mover assembly 50 is comprised of: a substantial cylindrical piston 18 provided at an upper side; and a mover 52 of an electromagnetic driving mechanism 51 provided at a lower side of said piston 18. Said piston 18 is connected coaxially with respect to said mover 52. On the other hand, said mover 52 is comprised of: a base main body 53 defining a mover base portion; an inner yoke 54 mounted on an outer periphery of said base main body 53; permanent magnets 24 mounted on an outer periphery of said inner yoke 54; spacer 55 for positioning said permanent magnets 24 in an axial direction; and a fixing member 26 defining said mover base portion and provided for the purpose of fixing said inner yoke 54 to said base main body 53. Said spacer 55 is made from electrically insulating material similarly to said piston 18. At the center of said base main body 53, a rod through-hole 56 is formed corresponding to a rod through-hole 21 of said piston 18. Said piston 18 and said mover 52 are connected coaxially and adjacently in an axial direction to each other, by inserting a male screw 28 formed on said fixing member 26 and positioned at an upper end side of said mover 52 into said piston 18 from the lower end of said piston 18 and then threading said male screw 28 into a female screw 29 formed on an inner side of said piston 18. Said permanent magnets 24 is clamped and held by said piston 18 and base main body 53 (mover base portion) indirectly through said spacer 55, by threading the male screw 28 of said fixing member 26 into said female screw 29 of said piston 18. As described above, said permanent magnets 24 can be held easily by said mover 52 by clamping and holding said permanent magnets 24 between said piston 18 and base main body 53, thereby not only can said mover assembly 50 be easily assembled, but an extension of dimensions in axial direction of said mover assembly 50 can be minimized because said piston 18 and said mover 52 are positioned adjacently to each other in an axial direction. Outer diameter Rp of said piston 18 is formed slightly greater than the outer diameter Rm of said mover 52.

Next is an explanation of a third embodiment of present invention with reference to FIG. 7. It is noted that common compositions and/or effects between third embodiment and above described embodiments will be omitted, for example in these embodiments compositions other than those of the mover assembly 60 and effects are common. Said mover assembly 60 is comprised of: a substantially cylindrical piston 18 provided at an upper side; and a mover 62 of an electromagnetic driving mechanism 61 provided at a lower side of said piston 18. Said piston 18 is connected coaxially with respect to said mover 62. On the other hand, said mover 62 is comprised of: a base main body 63 defining a mover base portion; an inner yoke 54 mounted on an outer periphery of said base main body 63; permanent magnets 24 mounted on an outer periphery of said inner yoke 54; and a fixing member 26 defining said mover base portion and provided for the purpose of fixing said inner yoke 54 to said base main body 63. Said base main body 63 is made from an electrically insulating material similarly to said piston 18. At the center of said base main body 63, a rod through-hole 65 is formed corresponding to a rod through-hole 21 of said piston 18. Said piston 18 and said mover 62 are connected coaxially and adjacently in an axial direction to each other, by inserting a male screw 28 formed on said fixing member 26 and positioned at an upper end side of said mover 62 into said piston 18 from the lower end of said piston 18 and then threading said male screw 28 into a female screw 29 formed on an inner side of said piston 18. Said permanent magnets 24 is clamped and held directly by said piston 18 and base main body 63 (mover base portion), by threading the male screw 28 of said fixing member 26 into said female screw 29 of said piston 18. As described above, said permanent magnets 24 can be held easily by said mover 62 by clamping and holding said permanent magnets 24 between said piston 18 and base main body 63, thereby not only can said mover assembly 60 be easily assembled, but an extension of dimensions in an axial direction of said mover assembly 17 can be minimized because said piston 18 and said mover 62 are positioned adjacently to each other in an axial direction. Furthermore, since said base main body 63 is made from an electrically insulating material, no eddy current will be generated to said base main body 63 even if a portion covering an outside and lower side of said inner yoke 54 in said base main body 63 enters into a magnetic field generated by said stator 35. Therefore, eddy current loss can be kept to a lower level, thereby raising the efficiency of said electromagnetic driving mechanism 61. Outer diameter Rp of said piston 18 is formed slightly greater than the outer diameter Rm of said mover 62.

Next is an explanation of a fourth embodiment of present invention with reference to FIGS. 8 and 12. It is noted that common compositions and/or effects between fourth embodiment and above described embodiments will be omitted, for example in these embodiments compositions other than those of the mover assembly 70 are common, and in these embodiments effects are partly common. Said mover assembly 70 is comprised of: a substantially cylindrical piston 18 provided at an upper side; and a mover 72 of an electromagnetic driving mechanism 71 provided at a lower side of said piston 18. Said piston 18 is connected coaxially with respect to said mover 72. On the other hand, said mover 72 is comprised of: a base main body 73 defining a mover base portion; an inner yoke 74 disposed on an outer periphery of said base main body 73; permanent magnets 24 mounted on an outer periphery of said inner yoke 74; spacer 55 for positioning said permanent magnets 24 in an axial direction; and a fixing member 76 defining said mover base portion and provided for the purpose of fixing said inner yoke 74 to said base main body 73 through said spacer 75. Said spacers 55 and 75 are made from electrically insulating material similarly to said piston 18. At a center of said base main body 73, a rod through-hole 77 is formed corresponding to a rod through-hole 21 of said piston 18. Said inner yoke 74 is configured by disposing a number of straight wires 74A trimmed to predetermined length into a cylindrical alignment as a whole. These straight wires 74A are made from magnetic steels (silicon steels or the like) with electrically insulating layers formed on their surface (typically just the oxide layer) and may be of a round cross-section or hexagonal cross-section for higher packing density or some other cross section designed for good packing properties, and are aligned to be parallel with the axial directions of said piston 18 and the mover 72. For example, the cross-sectional area of the wire (74B, 74C, 74D) may be hexagon, tetragon or triangle as shown in the FIGS. 10, 11 and 12 respectively. The linear dimension of the cross-sectional area of the wires 74A is chosen such that eddy current losses are minimized. Said piston 18 and said mover 72 are connected coaxially and adjacently in an axial direction to each other, by inserting a male screw 78 formed on said fixing member 76 and positioned at an upper end side of said mover 72 into said piston 18 from the lower end of said piston 18 and then threading said male screw 78 into a female screw 29 formed on an inner side of said piston 18. Said permanent magnets 24 is clamped and held by said piston 18 and the base main body 73 (the mover base portion) indirectly through said lower spacer 55, by threading the male screw 78 of said fixing member 76 into said female screw 29 of said piston 18. As described above, said permanent magnets 24 can be held easily by said mover 72 by clamping and holding said permanent magnets 24 between said piston 18 and the base main body 73, thereby not only can said mover assembly 70 be easily assembled, but an extension of dimensions in the axial direction of said mover assembly 70 may be minimized because said piston 18 and said mover 72 are positioned adjacently to each other in the axial direction. Outer diameter Rp of said piston 18 is formed slightly greater than the outer diameter Rm of said mover 72.

Next is an explanation of effects of fourth embodiment of present invention. In this embodiment, said inner yoke 74 is made from straight wires 74A as described above and said wires 74A are aligned to be substantially parallel with respect to the axial direction of said mover 72 and said piston 18. By this alignment, efficiency of said electromagnetic driving mechanism 71 can be improved by increasing total cross-section area of said wires 74A with respect to cross-section area occupied by whole said inner yoke 74 (packing density) compared to a conventional inner yoke in which sheet steels are aligned cylindrically and radially. Contrary saying, if total cross-section area of wires 74A defining said inner yoke 74 are same with a total cross-section area of sheet steels defining the inner yoke of a conventional structure, the outer diameter of said inner yoke 74 can be reduced compared to the outer diameter of the inner yoke of a conventional structure, and thereby the outer diameter Rm of said mover 72, inner diameter Rs and outer diameter of said stator 35 positioned outside said mover 72, and eventually the outer diameter of a whole Stirling cycle cooler can be reduced. (It is noted that "cross-section area" of the inner yoke 74 in this case means cross-section area of the inner yoke 74 taken by cutting the inner yoke 74 in an orthogonally crossing direction with respect to the central axis Z of said piston 18 and mover 72.) Explanation of other effects of this embodiment is omitted because they are common with the effects of foregoing other embodiments.

It is noted that present invention is not limited to above stated embodiments, and various modifications can be made within the scope of the present invention, particularly by those skilled in the art. In the above embodiments, a free-piston type Stirling cycle cooler using the so-called reverse Stirling cycle is taken as an example of a Stirling cycle machine, however, the present invention may be applied to a Stirling cycle engine (power producer or 'prime mover') using the power producing Stirling cycle (In this case, an electromagnetic mechanism in this invention corresponds to a generator sometimes called a 'linear alternator', instead of the electromagnetic driving mechanism as described in above embodiments). A further application may include a linear compressor or any other similar linear motion device, otherwise, a spacer may be disposed between said piston and mover instead of the disposition in the above described embodiments in which said piston and mover are adjacently positioned to each other, because what is important is that said piston and mover are coaxially disposed in an axial direction. Similarly, a spacer may be disposed between said cylinder and stator instead of the disposition in the above described embodiments in which said cylinder and stator are adjacently positioned to each other, because what is important is that said cylinder and stator are coaxially disposed in an axial direction. Moreover, in the third embodiment, the base main body may be formed of metal, if there is no possibility that a portion covering both an outside and lower side of said inner yoke of said base main body enters into a magnetic field. Moreover, in the above described embodiments, whole said piston is formed of an electrically insulating material, however, only a mover side portion of said piston, which has a possibility to enter into a magnetic field generated by said stator, may be formed of an electrically insulating material, because what is important is avoiding the generation of eddy current.

Figure 1:
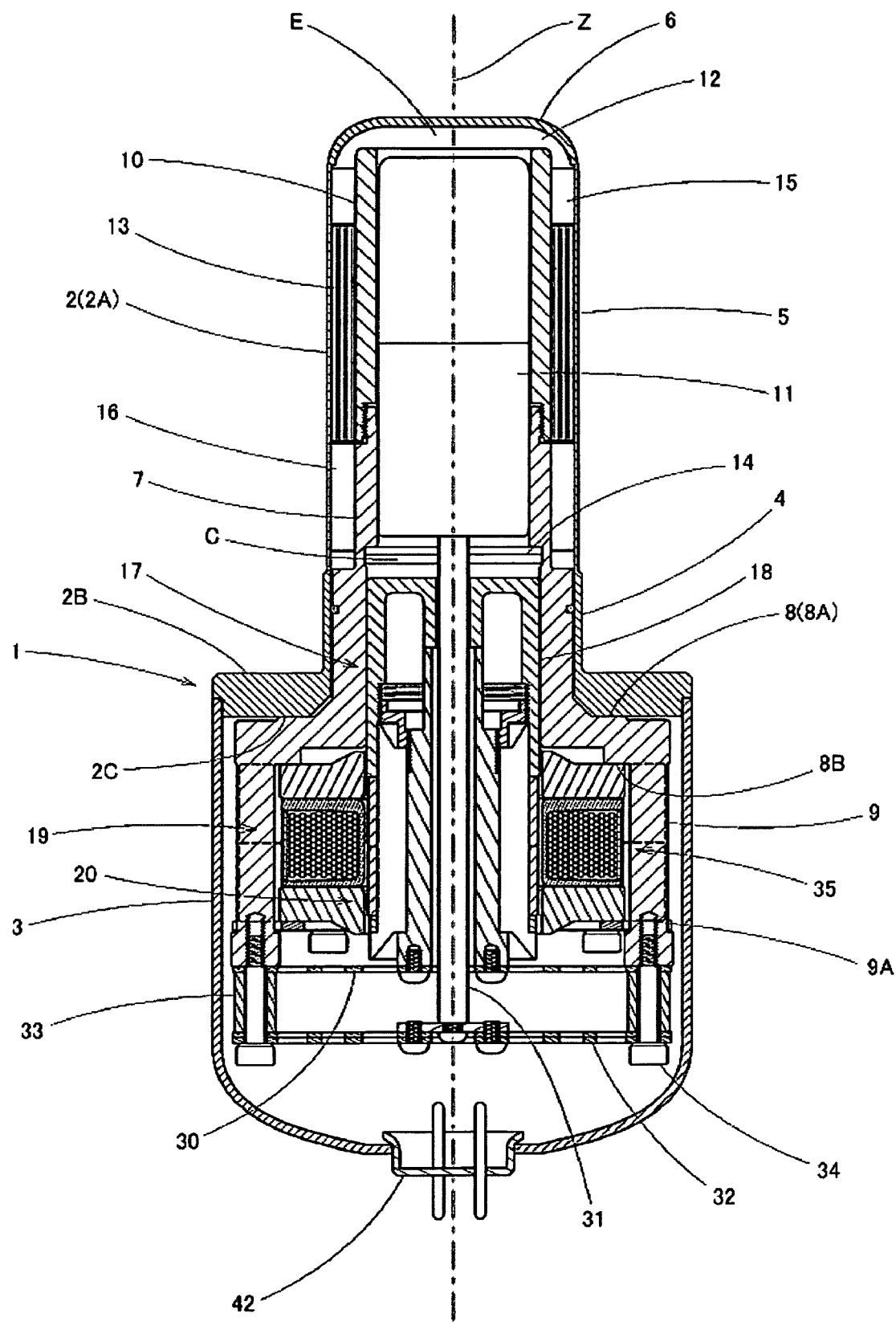
FIG. 1 is a cross-sectional view of a free-piston Stirling cycle cooler showing the first embodiment according to the present invention.
Figure 2:
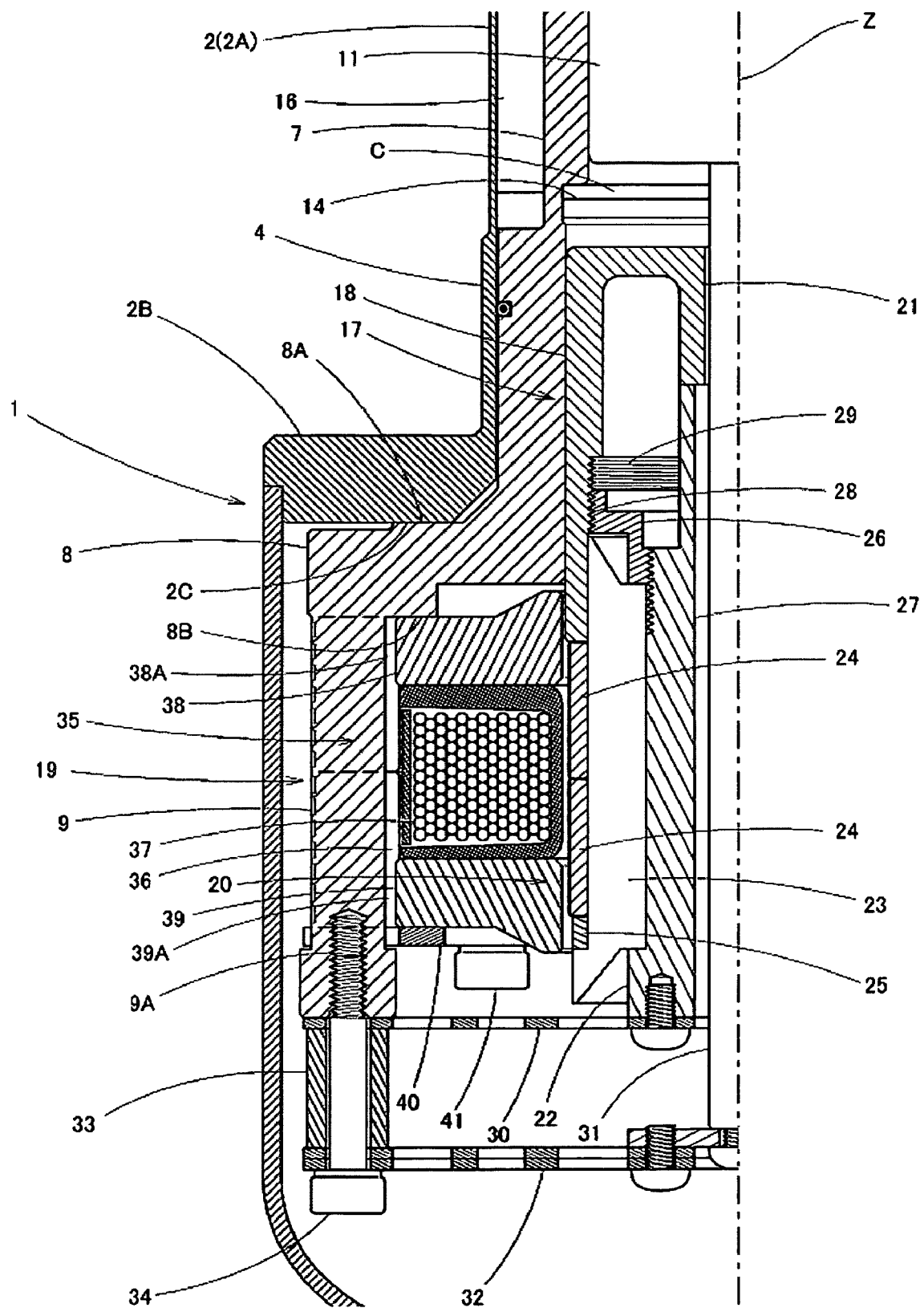
FIG. 2 is an enlarged cross-sectional view of a main part of a free-piston Stirling cycle cooler showing the first embodiment according to the present invention.
Figure 3:
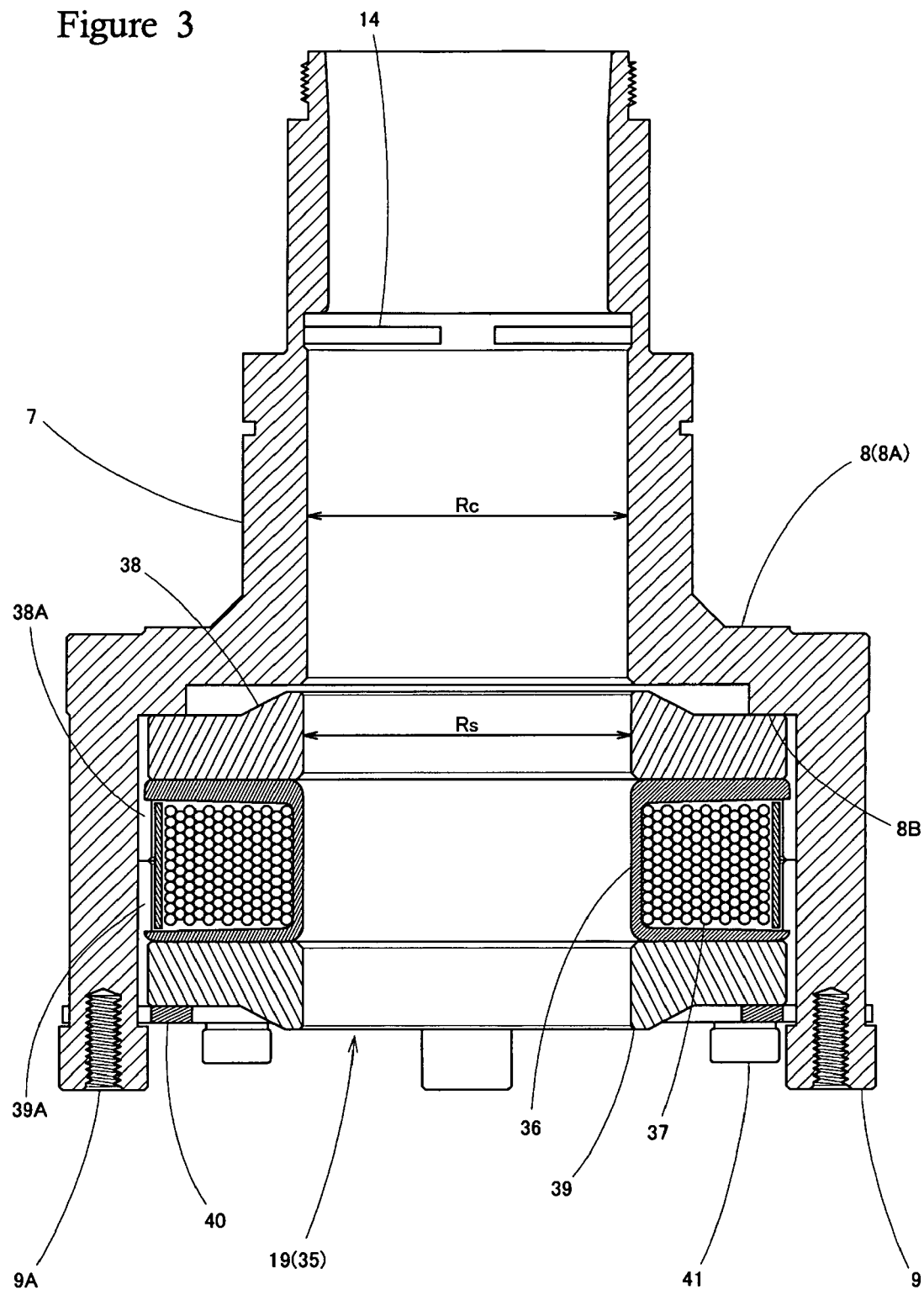
FIG. 3 is an enlarged cross-sectional view of a free-piston Stirling cycle cooler under a condition where a stator of an electromagnetic driving mechanism is fixed to a cylinder, showing the first embodiment according to the present invention.
Figure 4:
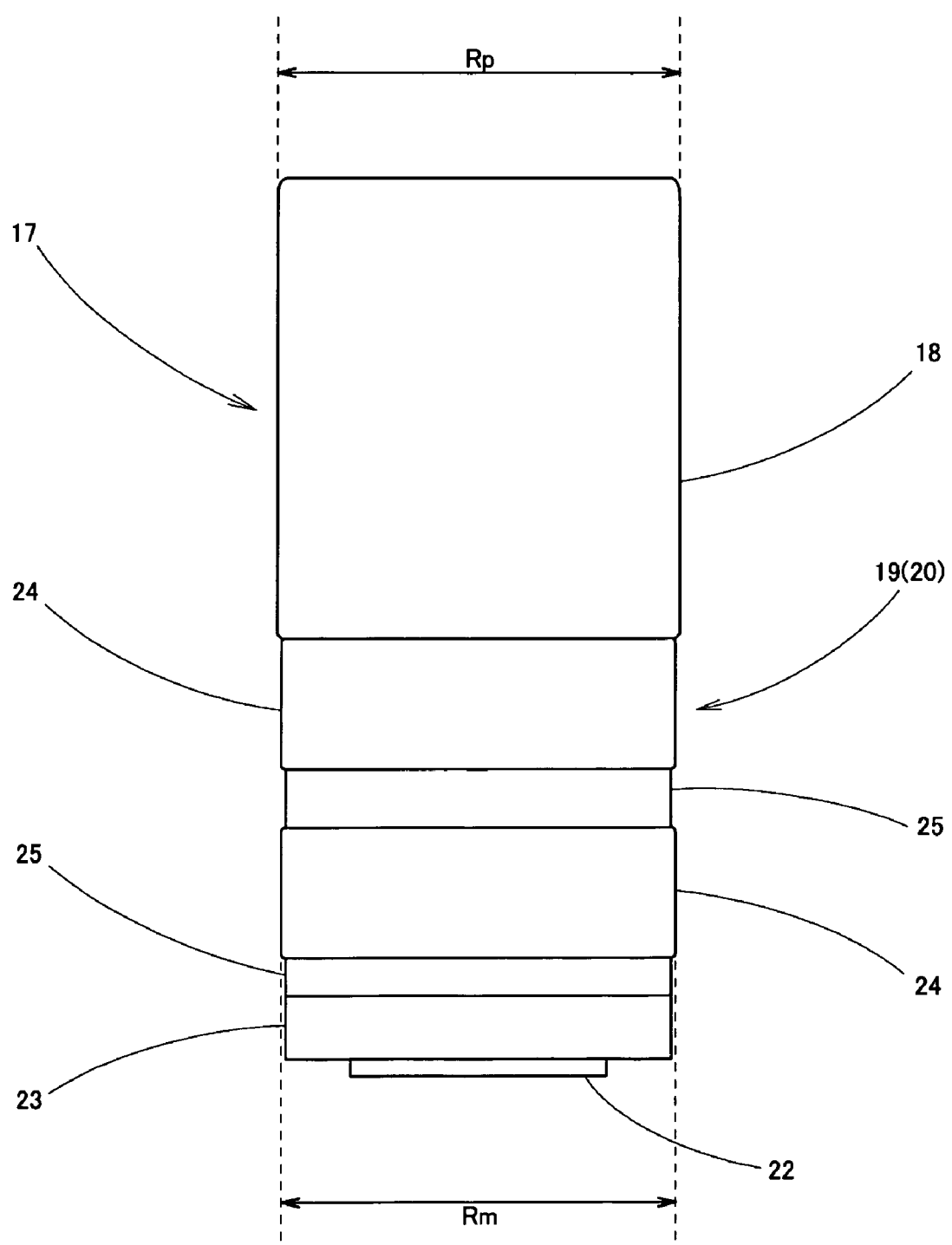
FIG. 4 is an enlarged view of a free-piston Stirling cycle cooler under a condition where a mover of an electromagnetic driving mechanism is fixed to a piston, showing the first embodiment according to the present invention.
Figure 5:
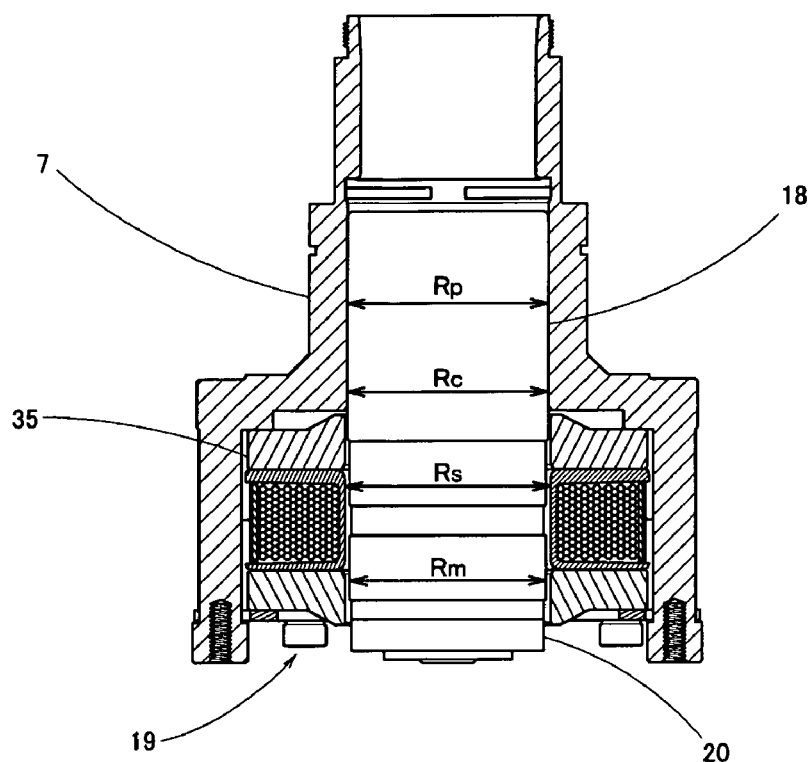
FIG. 5. is an explanatory view comparing the first embodiment and a conventional structure, wherein (a) is the structure according to the first embodiment and (b) is a conventional structure.
Figure 5:
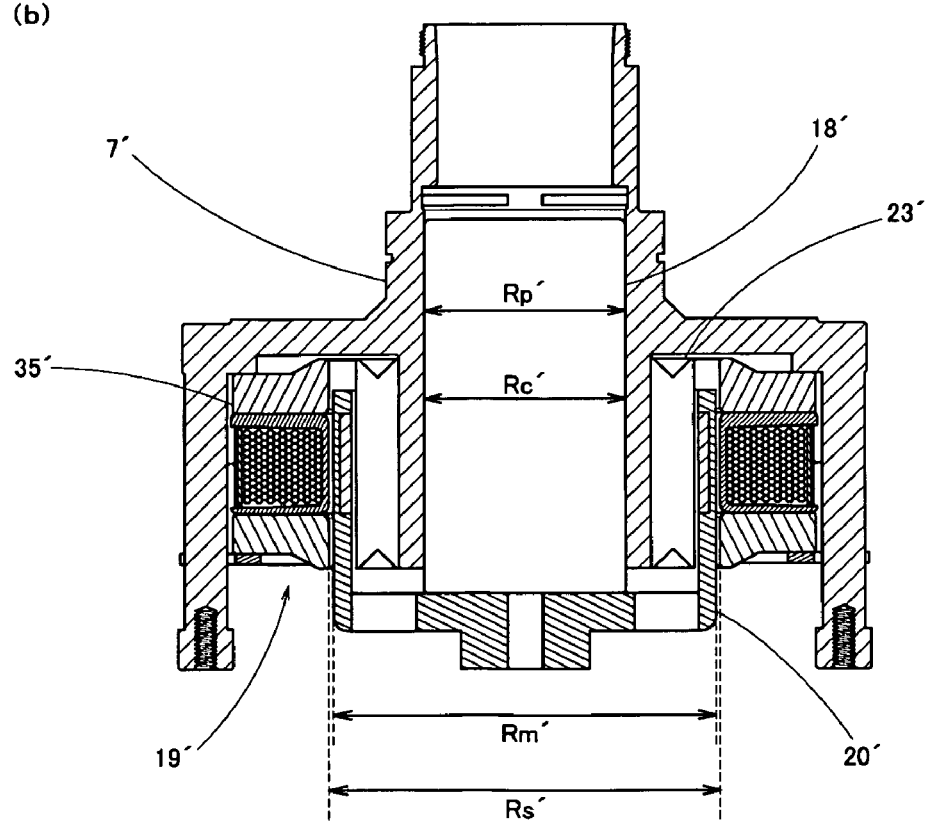
Figure 6:
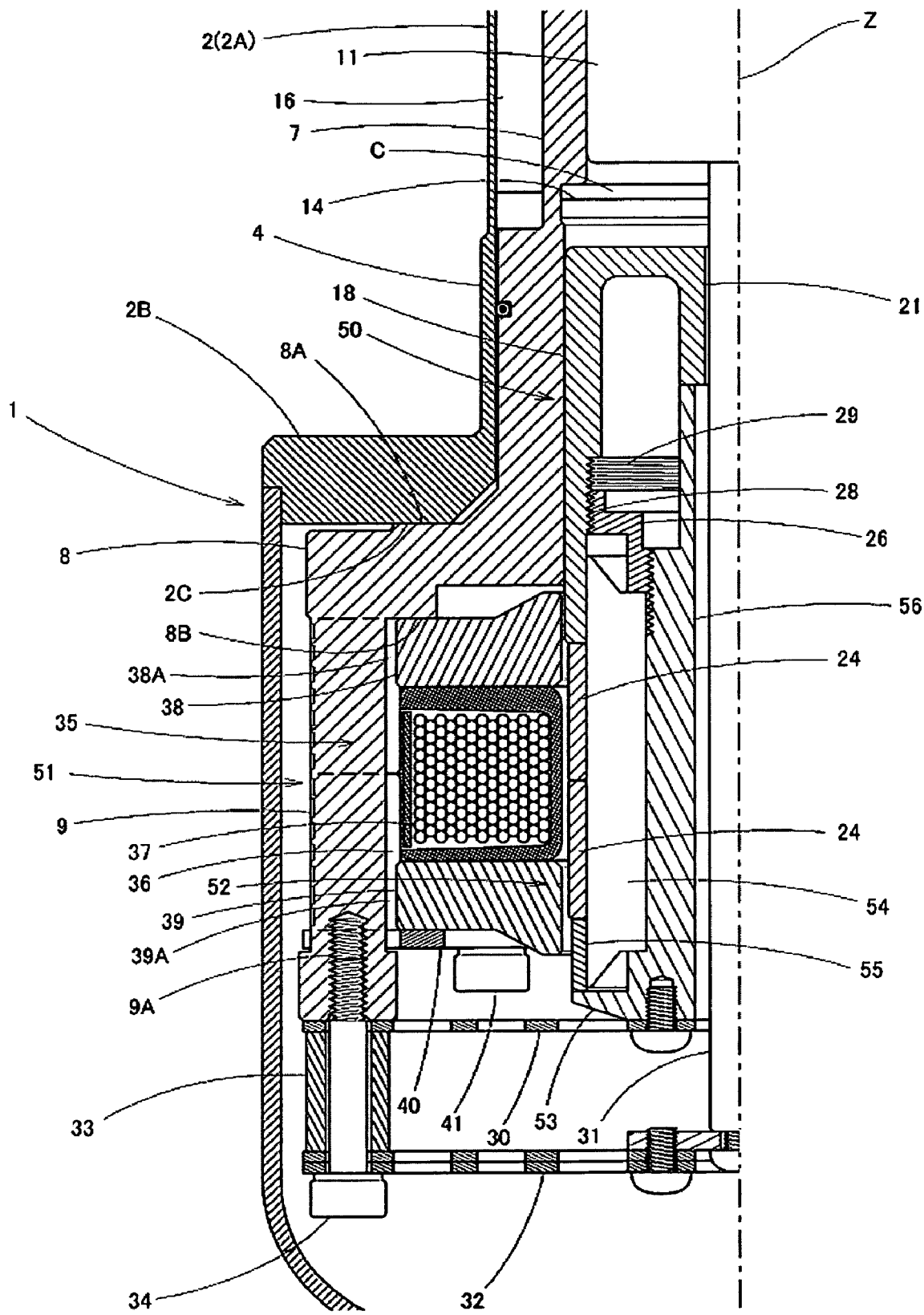
FIG. 6 is an enlarged cross-sectional view of a main part of a free-piston Stirling cycle machine showing the second embodiment according to the present invention.
Figure 7:
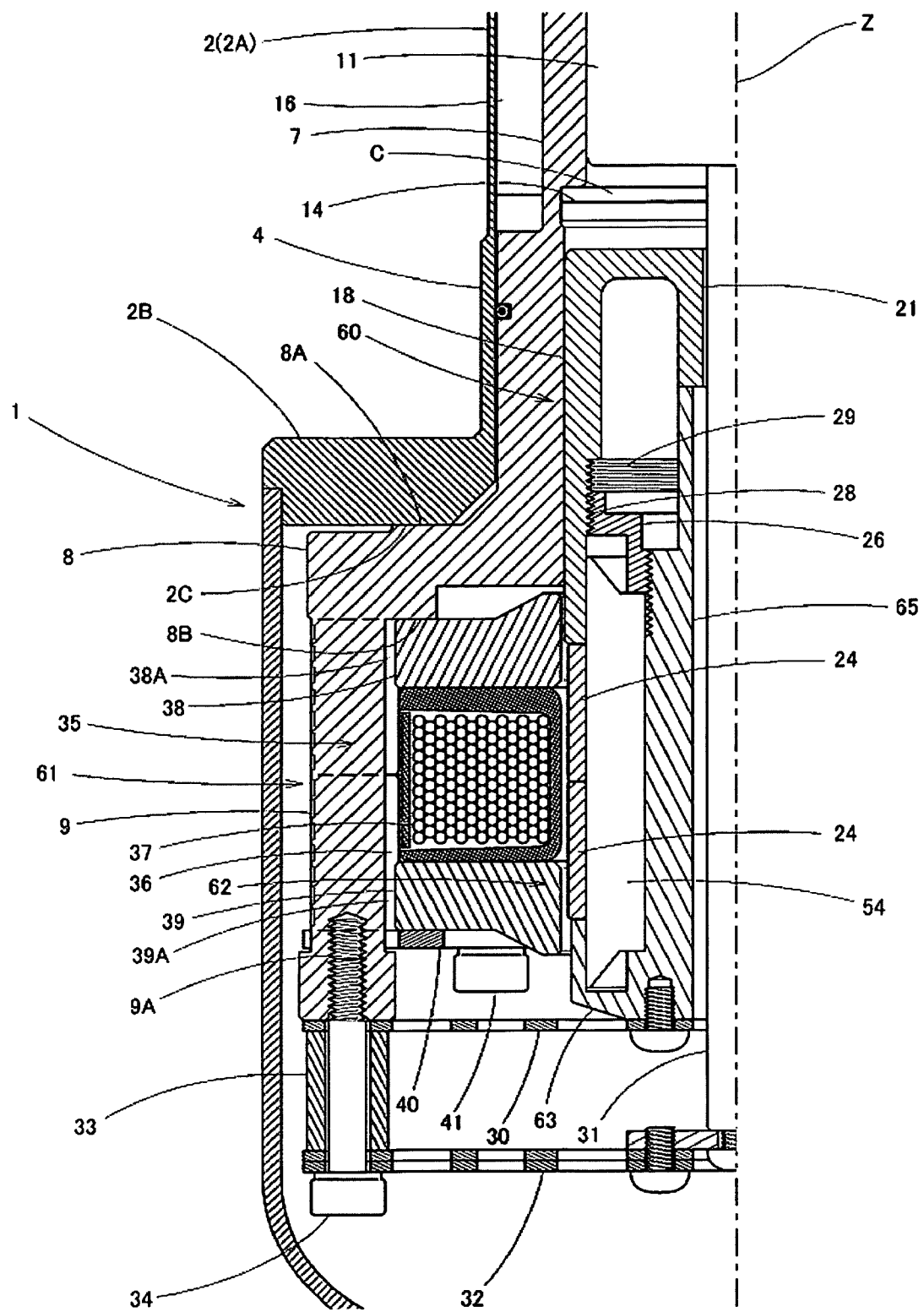
FIG. 7 is an enlarged cross-sectional view of a main part of a free-piston Stirling cycle machine showing the third embodiment according to the present invention.
Figure 8:
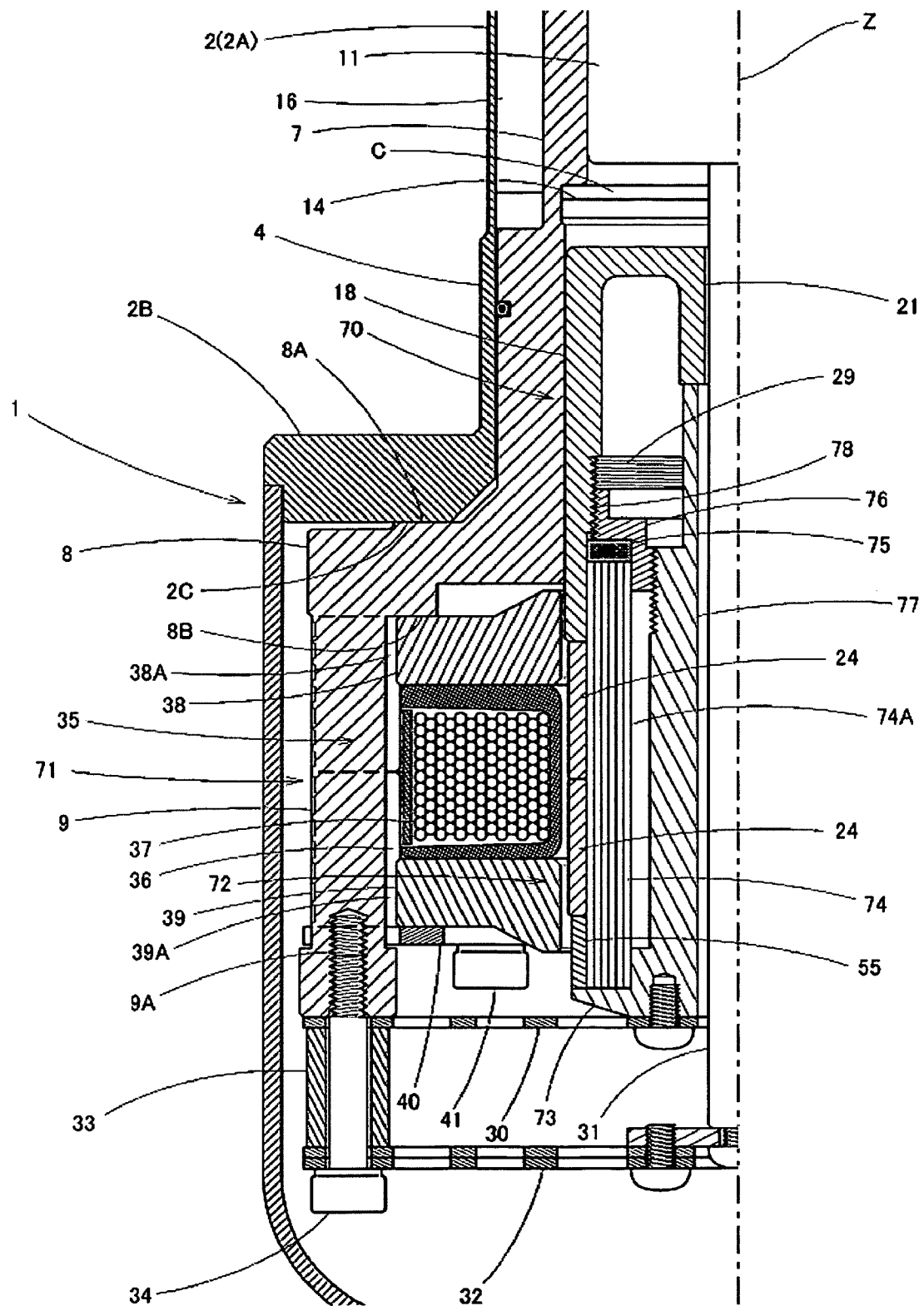
FIG. 8 is an enlarged cross-sectional view of a main part of a free-piston Stirling cycle machine showing the fourth embodiment according to the present invention.
Figure 9:
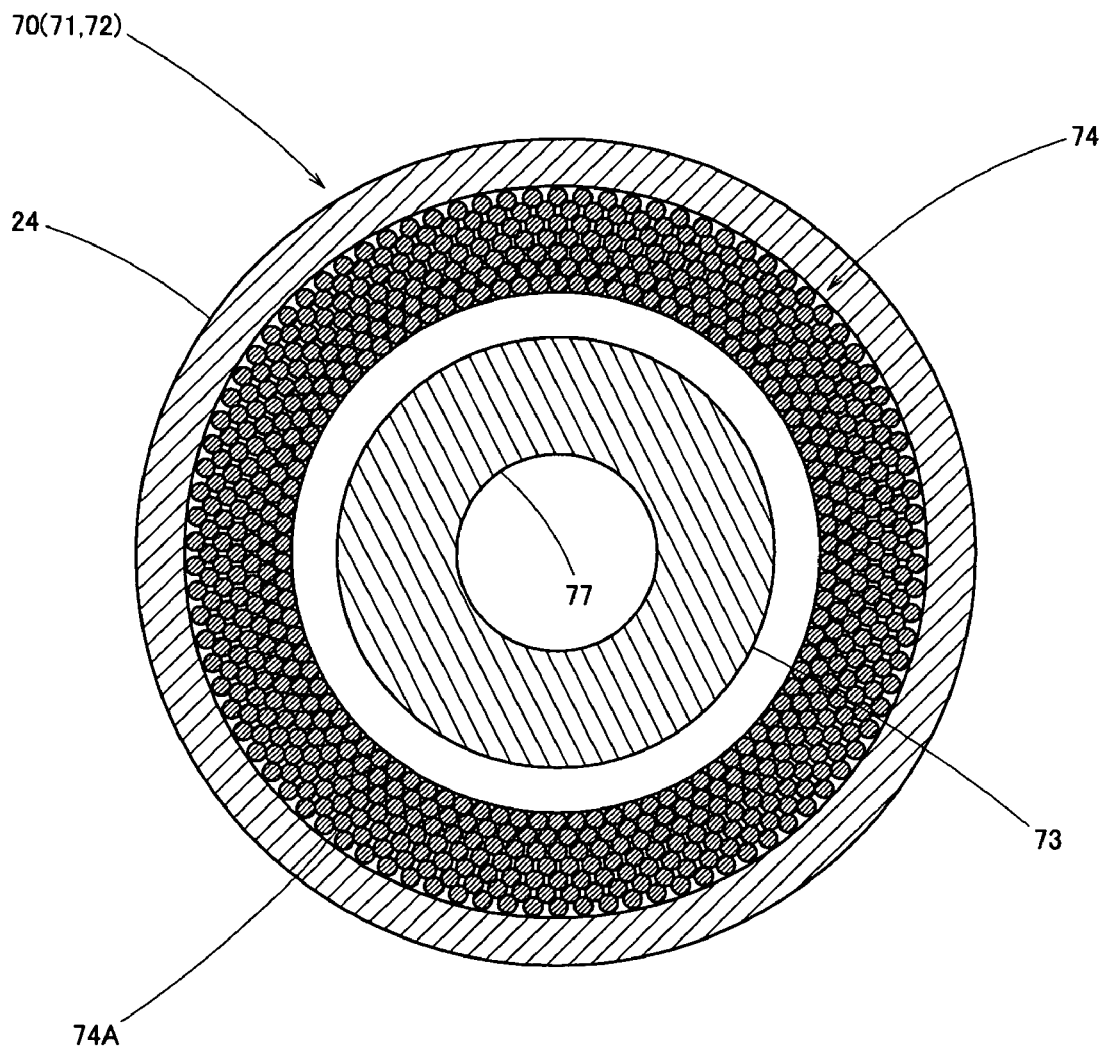
FIG. 9 is a more enlarged cross-sectional view of a mover taken by the line orthogonal to the axial direction, showing the fourth embodiment according to the present invention.
Figure 10:
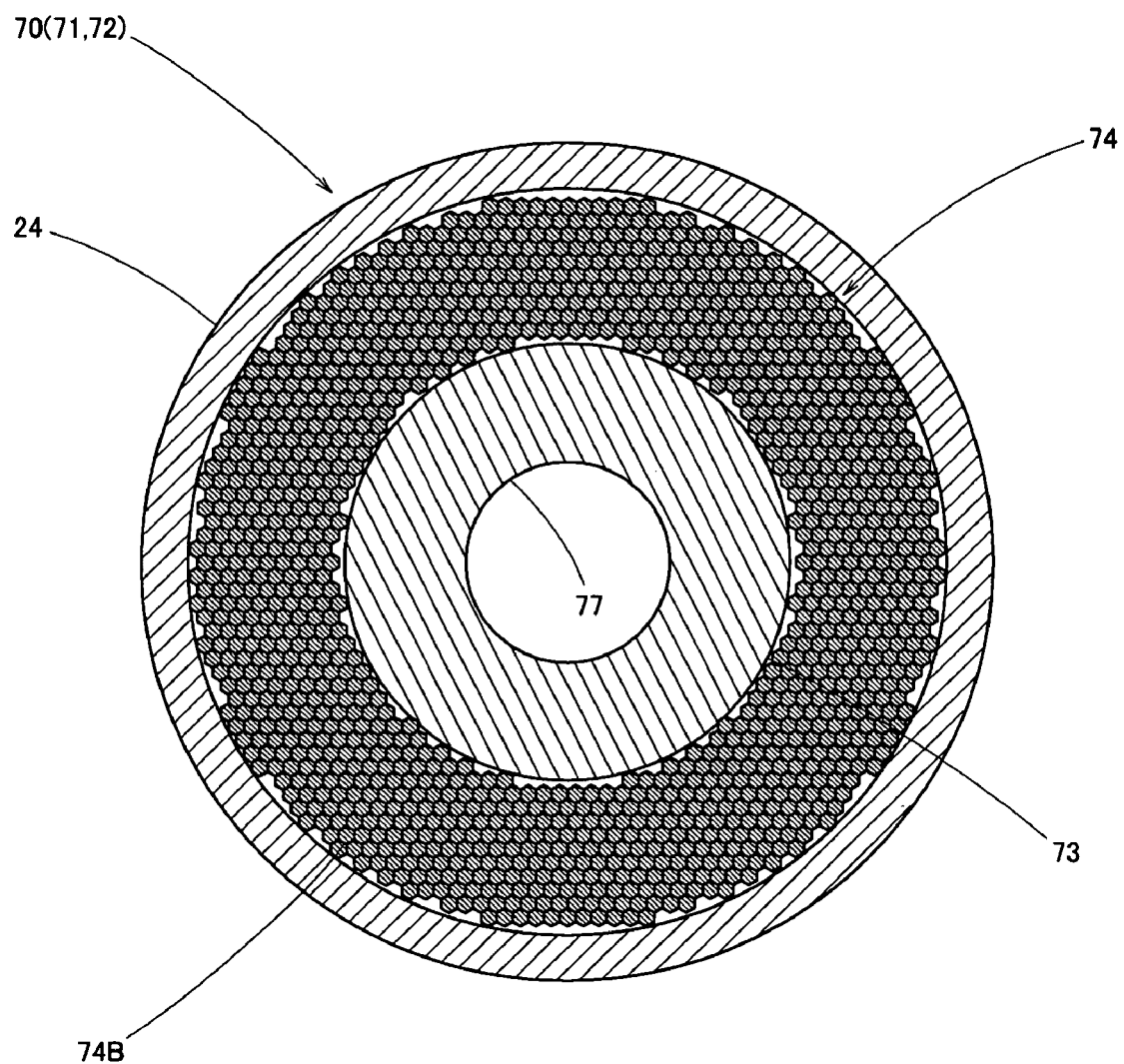
FIG. 10 is an enlarged cross-sectional view of a mover taken by the line orthogonal to the axial direction, when the cross-section of the wire is hexagon.
Figure 11:
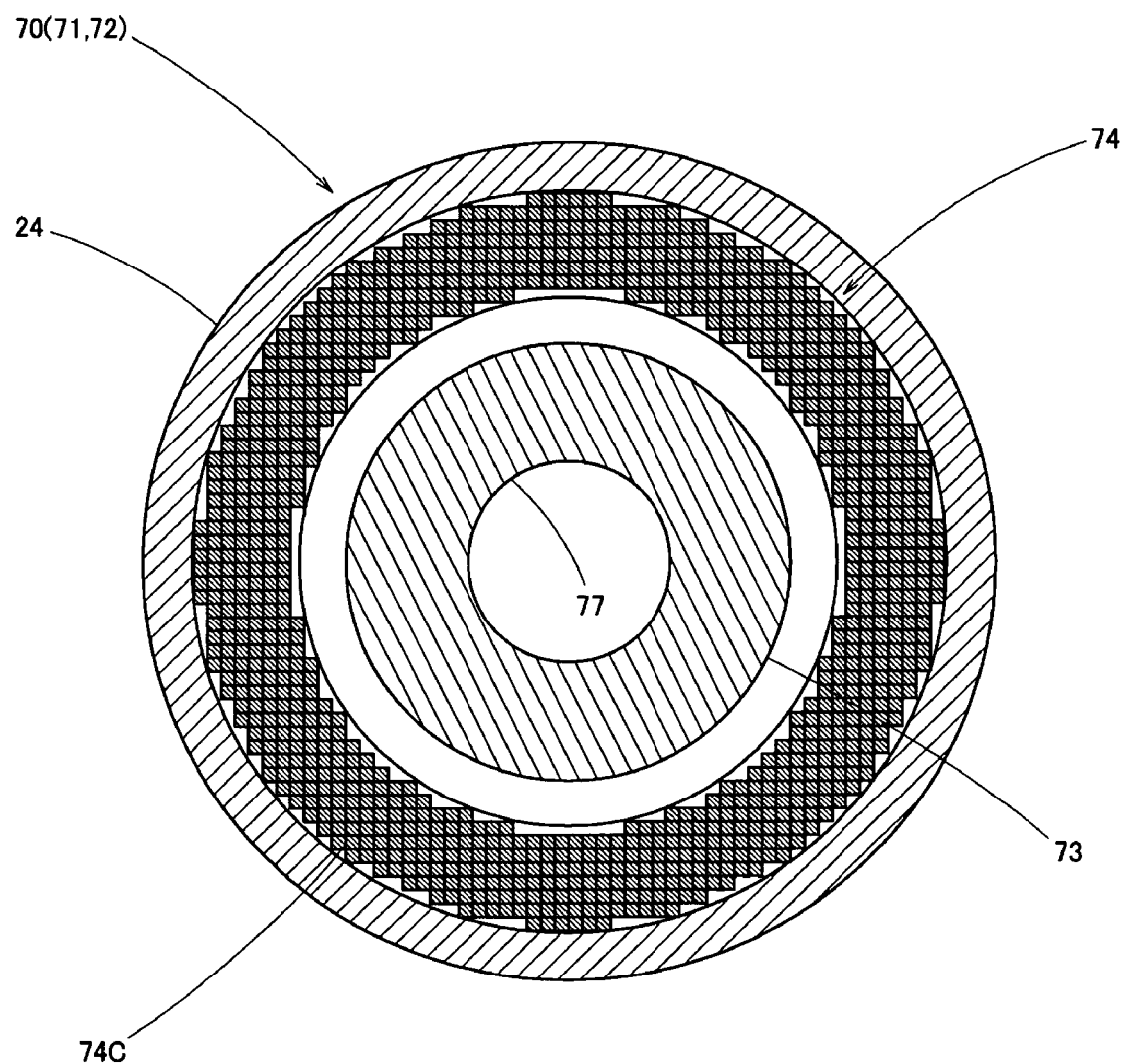
FIG. 11 is an enlarged cross-sectional view of a mover taken by the line orthogonal to the axial direction, when the cross-section of the wire is tetragon.
Figure 12:
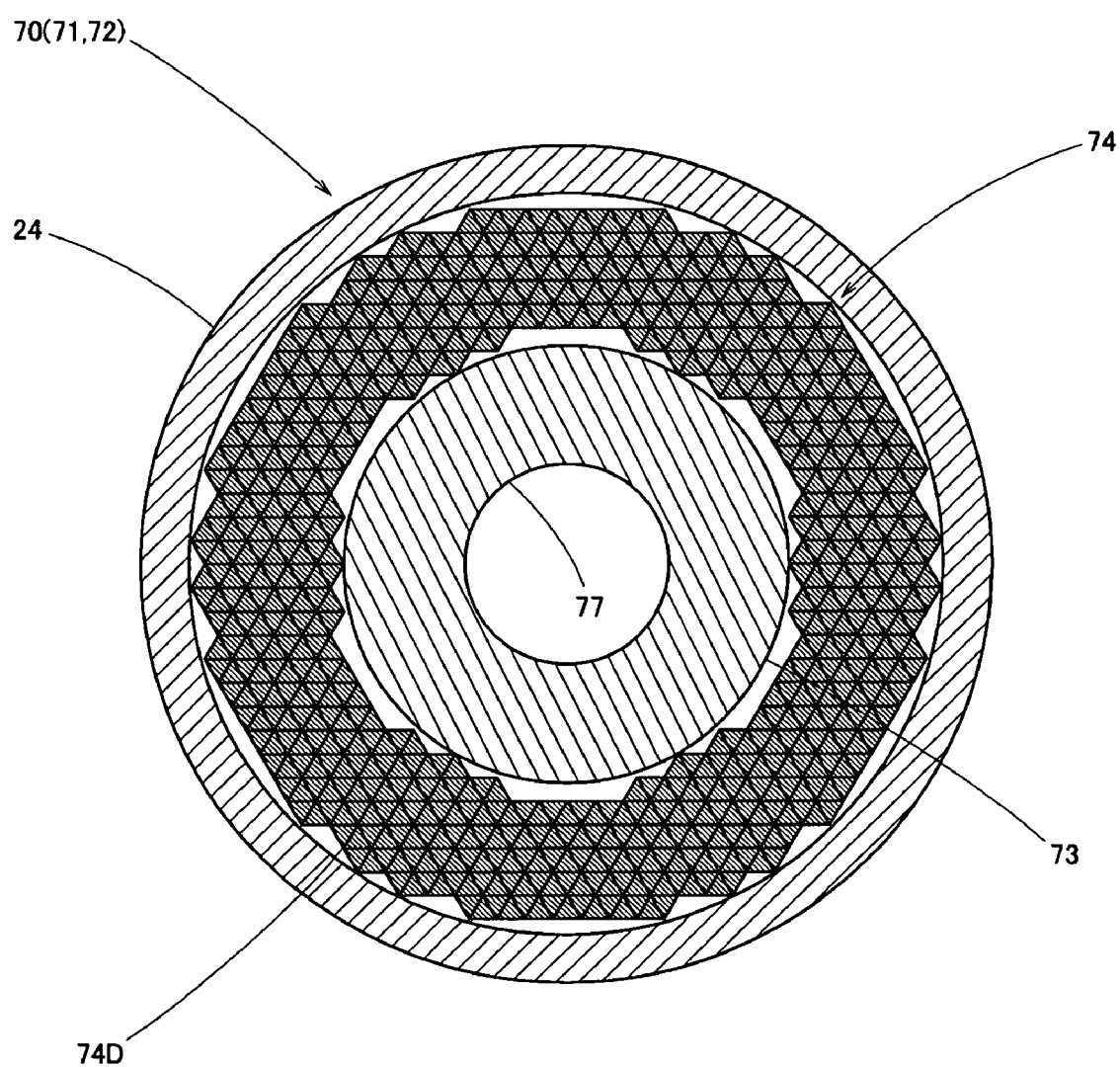
FIG. 12 is an enlarged cross-sectional view of a mover taken by the line orthogonal to the axial direction, when the cross-section of the wire is triangle.
Figure 13:
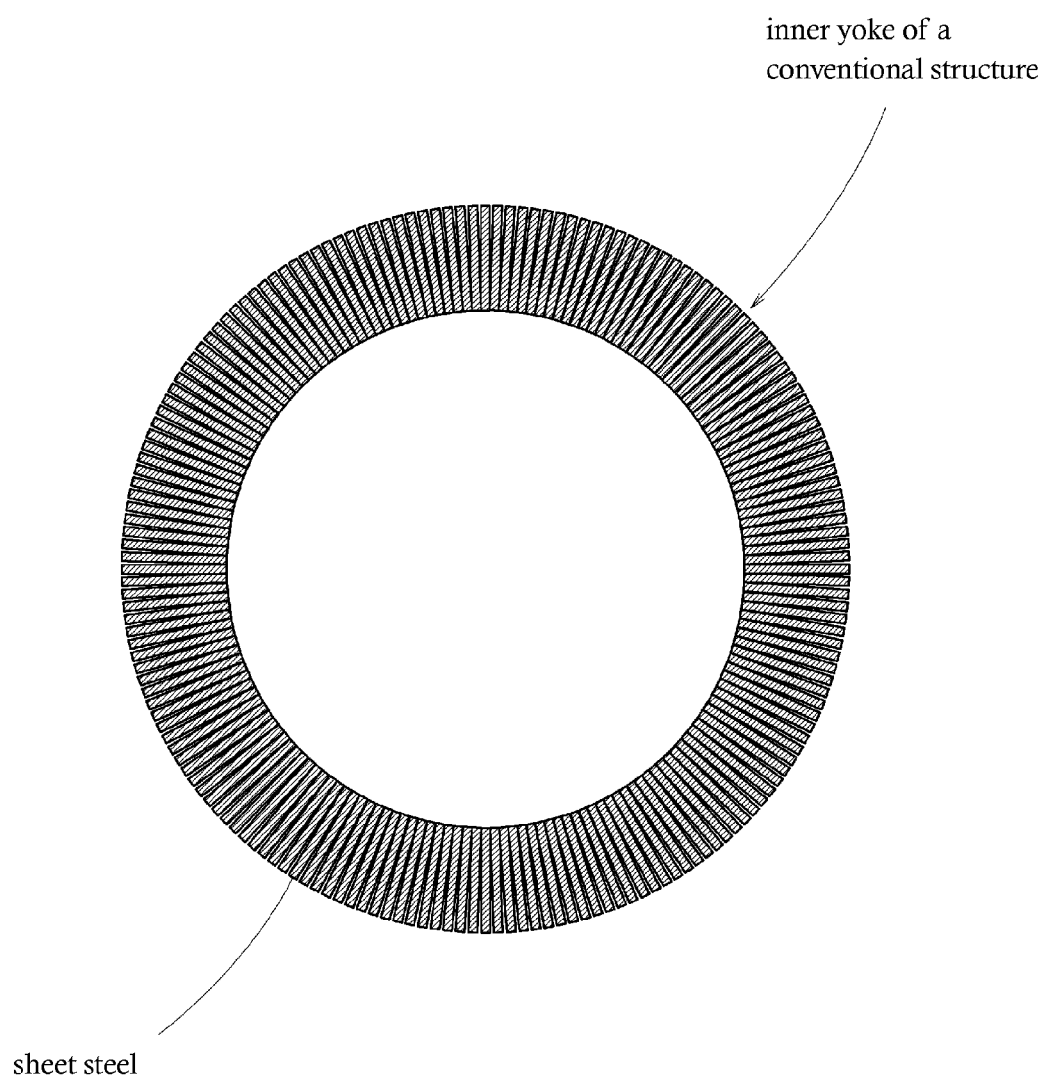
FIG. 13 is a cross sectional view of a conventional inner yoke.

| [Explanation of referential numerals] | |
|---|---|
| 7 | cylinder |
| 17, 50, 60, 70 | mover assembly |
| 18 | piston |
| 19, 51, 61, 71 | electromagnetic driving mechanism (electromagnetic mechanism) |

-continued

| [Explanation of referential numerals] | |
| --- | --- |
| 20, 52, 62, 72 | mover |
| 22, 53, 63, 73 | base main body (mover base portion) |
| 23, 54, 64, 74 | inner yoke |
| 24 | permanent magnet |
| 26, 76 | fixing member (mover base portion) |
| 35 | stator |
| 74A, 74B, 74C, 74D | wires |
| Rp | outer diameter of a piston |
| Rm | outer diameter of a mover |
| Rc | inner diameter of a cylinder |
| Rs | inner diameter of a stator |

The invention claimed is:

1. A Stirling cycle machine comprising of a cylinder, a piston which is reciprocable in said cylinder and an electromagnetic mechanism comprised of a stator and a mover, wherein said mover is comprised of an inner yoke made of magnetic flux conducting material and a permanent magnet provided outside said inner yoke, said mover of said electromagnetic mechanism and said piston being disposed adjacently to each other in an axial direction and in an axial alignment, said mover having an outer diameter which is equal to or smaller than the outer diameter of said piston, said stator having an inner diameter, which is equal to or greater than the inner diameter of said cylinder, and said stator of said electromagnetic mechanism and said cylinder being disposed in an axial alignment.

2. A Stirling cycle machine according to claim 1, wherein said permanent magnet of said mover is clamped and held by said piston and a mover base portion defining said mover.

3. A Stirling cycle machine according to claim 1 or 2, wherein at least said mover side of said piston is formed of electrically insulating material.

4. A Stirling cycle machine according to claim 3, wherein said inner yoke is formed of magnetic flux conducting wires and said wires are aligned substantially parallel with an axial direction of said mover and piston.

5. A Stirling cycle machine according to claim 1 or 2, wherein said inner yoke is formed of magnetic flux conducting wires and said wires are aligned substantially parallel with an axial direction of said mover and piston.

6. A Stirling cycle machine according to claim 5, wherein at least said mover side of said piston is formed of electrically insulating material.

* * * * *